United States Patent [19]

Frieberg et al.

[11] 4,134,438

[45] Jan. 16, 1979

[54] LOCKING DEVICE FOR THREADED FASTENERS

[76] Inventors: Bengt O. Frieberg, 869 Picaacho, La Habra Heights, Calif. 90631; Arthur B. Herpolsheimer, 3615 Longridge Ave., Sherman Oaks, Calif. 91403

[21] Appl. No.: 817,791

[22] Filed: Jul. 21, 1977

[51] Int. Cl.² ............................................... F16B 39/28
[52] U.S. Cl. ....................................... 151/35; 85/50 R
[58] Field of Search .................. 151/35, 34, 37, 41.75, 151/50; 85/50 R

[56] References Cited

U.S. PATENT DOCUMENTS

| 2,147,209 | 2/1939 | Olson | 151/37 |
| 2,557,288 | 6/1951 | Hosking | 151/35 |
| 2,778,399 | 1/1957 | Mroz | 151/35 |
| 3,500,886 | 3/1970 | Dvorak | 151/50 |
| 3,895,663 | 7/1975 | Bashline et al. | 151/35 |

FOREIGN PATENT DOCUMENTS

| 234813 | 7/1961 | Australia | 151/35 |
| 813333 | 10/1951 | Fed. Rep. of Germany | 151/35 |
| 2413760 | 11/1974 | Fed. Rep. of Germany | 151/35 |
| 60759 | 7/1954 | France | 151/37 |
| 246429 | 9/1947 | Switzerland | 151/35 |

Primary Examiner—James T. McCall
Attorney, Agent, or Firm—Francis X. LoJacono

[57] ABSTRACT

A locking device adapted for use with a bolt-and-nut type fastener, wherein the locking device comprises two annular washers (or one annular washer) and the under surface of a bolt head, the annular washers being formed with a cam face and a toothed face. The cam face thereof extends radially and outwardly from the central opening of the washer to a point less than the full width of the washer surface; and the toothed face thereof includes a plurality of radially extending teeth wherein each tooth thereof includes an outer enlarged portion for engagement with a work surface of the joint material, and an inner smaller portion adapted for engagement with the fastener, the cam surface being oppositely disposed over the inner smaller portion of the teeth, whereby the axial force applied by the fastener is transmitted from an inner radius to an outer radius of the adjoining washers, thus providing an action radius having an outwardly extended moment arm in order to apply greater force to the surface of the joint material.

10 Claims, 13 Drawing Figures

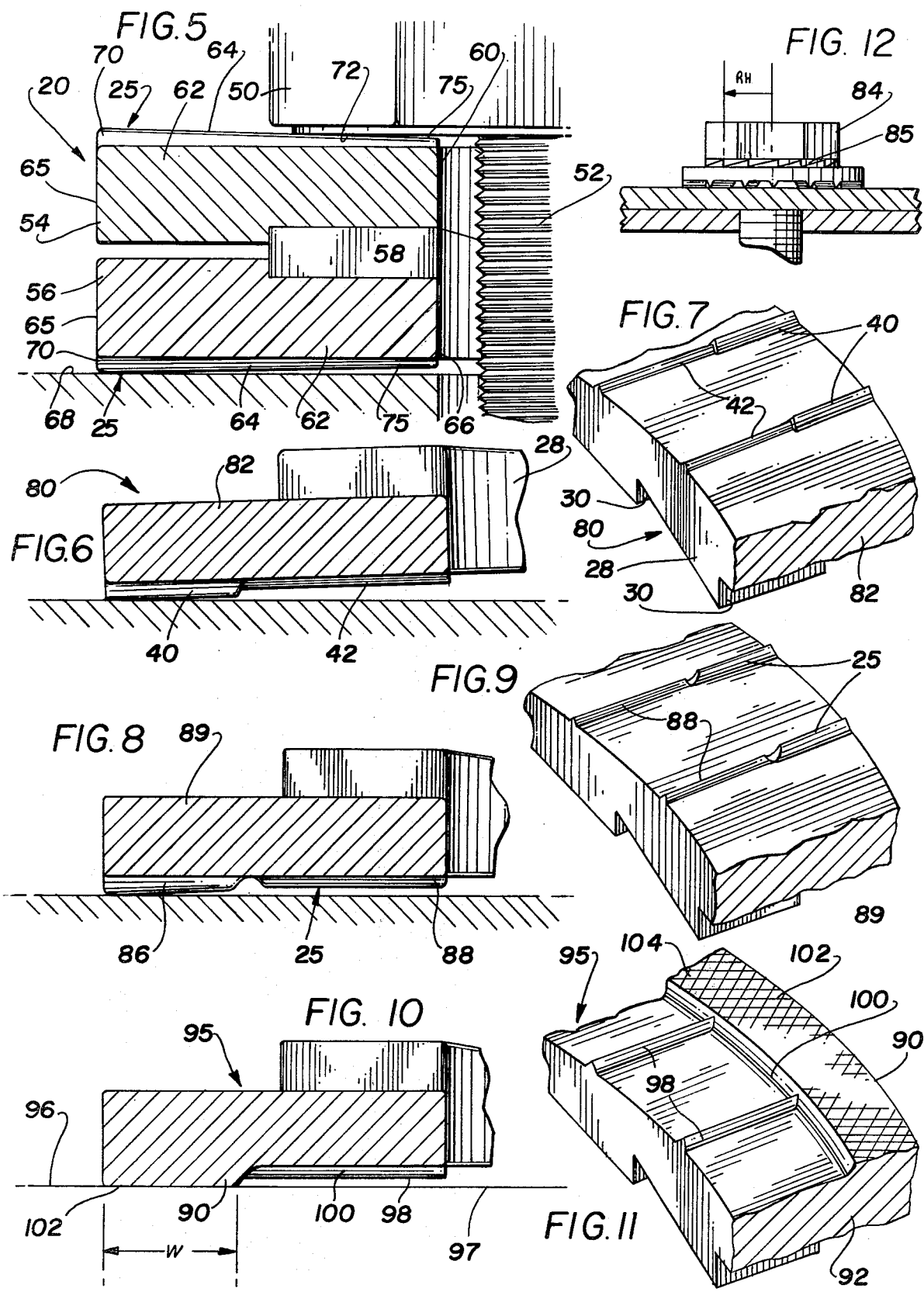

LOCKING DEVICE FOR THREADED FASTENERS

BACKGROUND OF THE INVENTION

1. Field of the Invention

This invention relates to locking devices for threaded fasteners and, more particularly, to lock washers having one cam surface and an oppositely disposed friction surface.

2. Description of the Prior Art

As is well known in the art, various problems and difficulties are encountered in providing suitable means for locking devices to cooperate with fastener means such as the typical bolt-and-nut fastener.

A particular problem arises when a locking device is employed against a very hard surfaced material — and, further, where such material must not be damaged by scratches or abrasions. Thus, known locking devices have not been able to overcome such problems.

In general, the locking devices known in the existing art are as follows:

1. A pair of identical annular lock washers, each having a cam face on one side and a friction face with radial extended teeth on the opposite side. The rise or pitch of the cams per degree of rotation is made greater than the rise of the threads of the fastener. The washer pair is installed cam-face to cam-face on a bolt-and-nut type fastener between the nut and the joint material, or between the head of a cap screw and the joint material.

2. A cap screw having the cam configuration described above formed into the underside of its head member, in order to interact directly with the cams of a single washer in the same manner as previously described.

3. A nut having a cam surface similar to that as described for the underside of the bolt head.

The above types of locking devices can be found in the following U.S. Pat. Nos:

3,895,663, John D. Bashline, et al;
3,263,727, Herpolsheimer;
3,329,190, Oldenkott;
743,822, Bryar.

The locking devices as above described are intended to function in the following manner: When the fastener is tightened, the washer adjacent the nut becomes fixed to the nut in a non-rotatable position due to the friction or embedding of the teeth in the surface of the nut. Likewise, the outer washer becomes fixed in a non-rotatable position to the surface of the joint material.

Thus, if a nut subjected to vibrational conditions attempts to rotate in the loosening direction, the mating washer is forced to "climb" the cams of the interacting washer that is fixed to the joint material, thereby increasing the initial clamping load and preventing the further loosening of the fastener.

However, under various conditions, the existing designs of the above-described locking devices do not offer positive and secure locking means for fasteners; and this has limited their acceptance and use thereof.

One type of installation where existing designs may not provide secure locking is where the surface of the joint material is smooth and harder than the teeth on the adjacent washer. The teeth then will not make any impact (become embedded) in the joint material; and only plain friction is provided to hold the washer and prevent it from rotating on the joint material when subjected to loosening forces.

Further, it is to be noted that existing designs of lock washers have cams as well as the teeth which are arranged to extend substantially the full width of the washer surface — that is, from the central hole extending radially and outwardly therefrom, and terminating at the outer periphery thereof.

SUMMARY OF THE INVENTION

The present invention comprises a pair of cooperating lock members of identical size and configuration, wherein each lock member defines a washer having formed on one surface thereof a plurality of contiguous end-to-end cam members; and on the opposite surface thereof there is formed a frictional surface, preferably including a plurality of radially extending tooth members. Each tooth member traverses substantially the full width of the washer body from the central hole to the peripheral outer edge thereof, wherein the height of the outer end of the tooth is greater than the height of the end adjacent the central hole. That is, the tooth member can be tapered from the outer edge downwardly and inwardly therefrom; or each tooth can be formed with an outer, enlarged body section extending inwardly substantially half the radius of the washer body, with the remaining tooth body section having a reduced height whereas only the outer edge or outer enlarged body section makes a frictional contact with the surface of the joint or work material.

The annularly disposed cam members are arranged to be disposed substantially opposite to the lower, inner edge of the tooth or the reduced body section of the tooth member. Thus, the width of the contiguously formed cams is less than the width of the washer body.

Hence, various embodiments are herein disclosed having the above general configurations, including those wherein the under surface of a bolt head or one surface of a nut is provided with cooperating cam members, whereby only one lock washer is required.

OBJECTS AND ADVANTAGES OF THE INVENTION

The present invention has for an important object a provision wherein a lock washer is formed on one surface thereof, and a plurality of cam members in an annular arrangement are disposed adjacent the inner hole of the washer — the width being less than the full width of the washer body; and wherein the other surface thereof is provided with a frictional engaging member disposed adjacent the outer peripheral edge of the washer body.

It is another object of the invention to provide a locking device of the general type referred to which — when two washers are arranged in a cooperating engagement with a fastener — will have an action radius (moment arm) of friction or tooth-embedding between the joint material and the friction face of the adjacent washer that is longer than the action radius (moment arm) of the forces of the cam rise and friction between the interacting cam faces, thus preventing the washer adjacent the surface of the joint material from turning in a loosening direction.

Another object is to provide a locking device wherein a cap screw includes a cam-face configuration formed into the underside of its head member and one interacting lock washer, wherein the washer has an action radius or moment arm of friction or tooth-embedding between its friction face and the joint material that is longer than the action radius or moment arm of the forces of the cam rise and friction between the interacting cam faces, thus preventing the washer from turning on the joint material in the loosening direction.

A further object of the present invention is to provide a locking device of this general character which has an action radius of friction or tooth-embedding between the nut or cap screw head and the friction face of the adjacent washer that is shorter than the action radius of the friction tooth or embedding between the joint material and the friction face of the adjacent washer — thus causing the nut or cap screw to turn on the adjacent friction face, and preventing the friction face of the washer adjacent the joint material from turning and damaging the joint material when the fastener is tightened.

Still another object of the invention is to provide a locking device of this character wherein the friction face includes a rough surface, such as one which is knurled, instead of having the teeth used on the general locking devices referred to, the knurled portion being on the part of the washer that makes direct contact with the joint material, in order to eliminate any damage to that material which could cause stress concentrations and subsequent fatigue conditions.

It is still another object of the present invention to provide a locking device produced by a manufacturing method using carbide punches for the coining of the cam configuration, thus providing a cam surface that is far smoother than any other known equally simple and economical manufacturing method, in order to achieve the lowest possible coefficient of friction for the cam surface.

Other characteristics, advantages and objects of this invention can be more readily appreciated from the following description and appended claims. When taken in conjunction with the accompanying drawings, this description forms a part of the specification wherein like references and characters designate corresponding parts in several views which are as follows.

DESCRIPTION OF THE DRAWINGS

Referring more particularly to the accompanying drawings, which are for illustrative purposes only:

FIG. 5 is an enlarged, cross-sectional view of two cooperating washers being locked together by a fastener;

FIG. 6 is an enlarged, cross-sectional view of an alternative embodiment of the present invention;

FIG. 7 is a perspective view of a portion of the lock washer;

FIG. 8 is a cross section of another embodiment thereof;

FIG. 9 is a perspective view of a portion thereof, showing a different arrangement of the teeth;

FIG. 10 is still another embodiment shown in cross-section and having a frictional surface formed along the outer annular edge thereof;

FIG. 11 is a perspective view of a portion thereof wherein the frictional surface is knurled;

FIG. 12 is a partial view of another alternative arrangement of the frictional teeth.

DESCRIPTION OF THE PREFERRED EMBODIMENT

Figure 1:
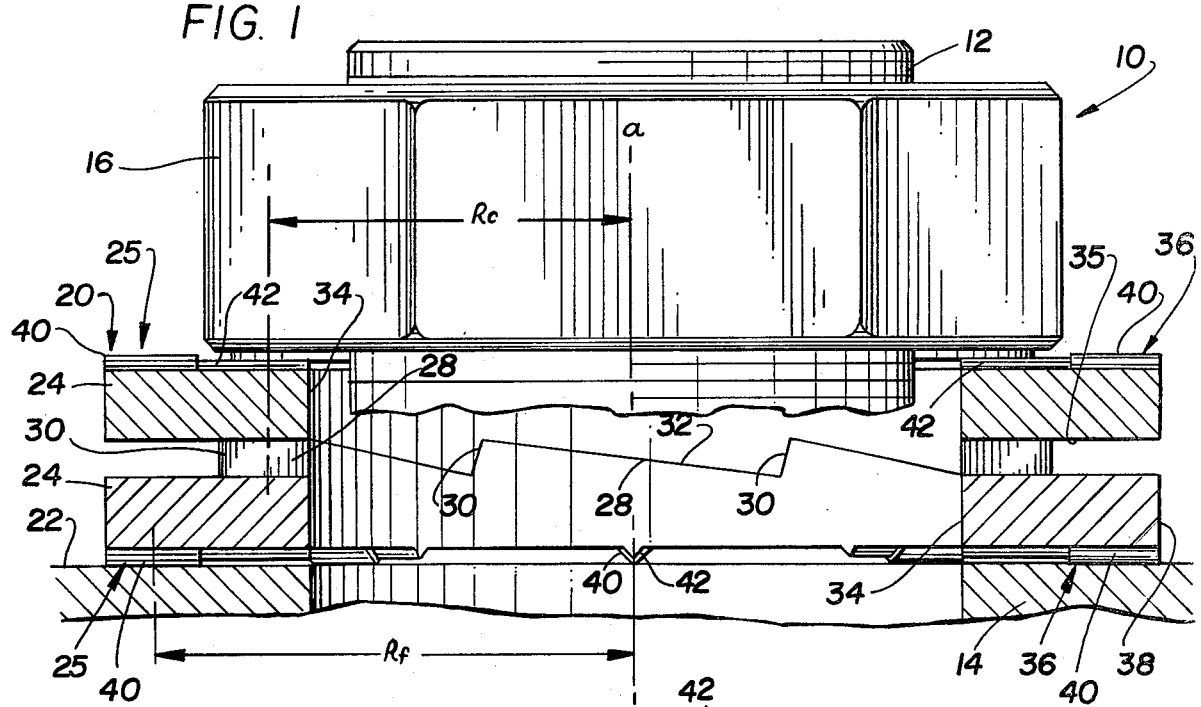
FIG. 1 is an enlarged, cross-sectional view of two cooperating lock washers interposed between a nut and the joint or work material.
Figure 13:
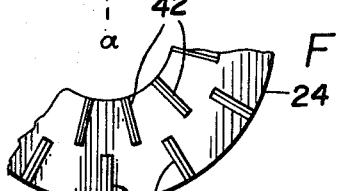
FIG. 13 is a partial view of one of the washer members shown in FIG. 1.

Referring more particularly to FIG. 1, there is shown a bolt-and-nut type of fastener, generally indicated at 10, having a bolt 12 which is secured to a workpiece or joint member 14 by nut 16. As is well known, this type of fastener is used under various conditions and arrangements wherein vibrations may cause loosening of the fastener. In order to prevent such a problem, a locking means, generally indicated at 20, is interposed between nut 16 and the surface of member 14. As previously mentioned, the problem is more apt to occur when surface 22 is of a much harder material than the washers.

To overcome this problem, it will be seen by the arrangement of the surfaces of the lock washers that an extended leverage force is applied between nut 16 and the workpiece 14.

Figure 3:
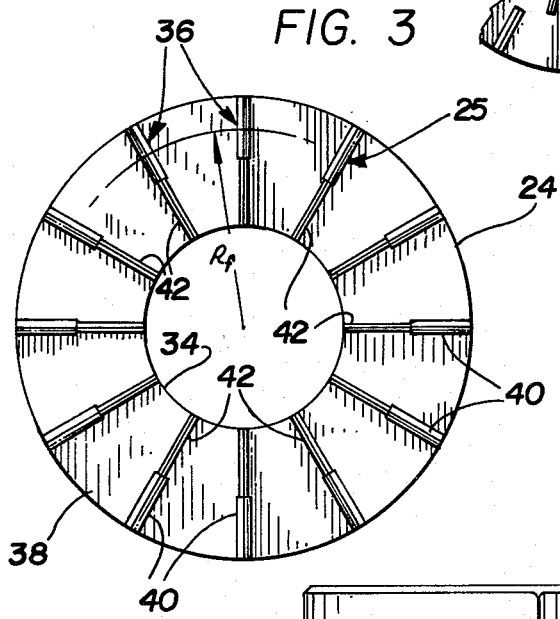
FIG. 3 is a plan view of the tooth surface of the lock washer.
Figure 4:
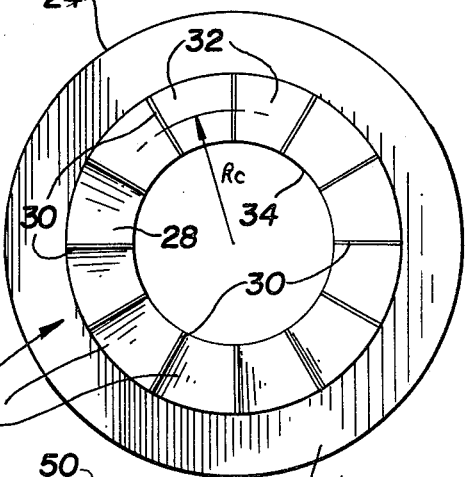
FIG. 4 is a plan view of the opposite surface having a plurality of cam members arranged in a contiguous annular ring adjacent the central hole thereof.

Accordingly, the present invention comprises a pair of lock-washer members 24, wherein members 24 are formed of an annular, substantially-flat, ring-like member having a defined width, as seen in FIGS. 3 and 4. One surface of said washer is formed with a frictional engaging means, generally indicated at 25; while the opposite side thereof is provided with cam-engaging means indicated at 26. The cam means comprises a plurality of cam members 28 arranged in an end-to-end, continuous manner having a slightly inclined front face 30, and a rearwardly inclined cam surface 32. Thus, there is formed a continuous ring of cam members integrally disposed about the inner central hole 34 of said washer. The widths of cam members 28 extend inwardly from central hole 34 to a point or radius less than that of the total width of washer member 24, as seen in FIGS. 1 and 4. This then provides a substantially flat annular surface area 35.

The tooth surface of washer 24, however, is provided with frictional engaging means 25 which comprises a plurality of tooth members 36 which extend radially and outwardly from the central hole 34 to the peripheral outer edge 38 of washer 24. However, each tooth member 36 includes a front or outer enlarged tooth section 40 and a rear or inner tooth section 42; wherein the inner tooth section is formed having a reduced height with respect to that of the outer tooth section 40. This can be seen in FIGS. 1 and 3. In addition, it should be noted that the outer tooth section 40 extends inwardly from the outer peripheral edge 38 to a point or radius equal to approximately half the width of the washer, with the smaller inner tooth section 42 extending from the terminating end of section 40 to the inner peripheral edge of hole 34.

Thus, when the locking means is applied as shown in FIG. 1, a pair of matching lock-washer members 24 is disposed over bolt 12, wherein each washer is assembled so as to have cam-face against cam-face, with the toothed face of each washer facing outwardly in opposite directions. That is, the washer positioned adjacent nut 16 has its inner tooth sections 42 engaging the nut; and it should be noted that nut 16 does not engage tooth section 40, nor does it extend over the outer half of the width of the washer 24. Further, the washer adjacent to and abutting joint members 14 has its outer tooth section 40 engaging surface 22. This then provides a unique extension of leverage from the fastener, through the washers, and to the joint material.

In order to prevent the washer adjacent to the joint material 14 from rotating in a loosening direction on joint material having a greater hardness than the engaging teeth of the washer, the following conditions must exist.

Mathematical symbols used:
$\mu_f$ = coefficient of friction or tooth embedding between friction face of washer and joint material.
$\mu_c$ = coefficient of friction between interacting washer cams.
$R_f$ = action radius (moment arm) of friction or tooth embedding between washer and joint material.
$R_c$ = action radius (moment arm) of cam rise and friction between the cams.
$\alpha°$ = cam angle - washers
$\lambda°$ = lead angle of threads on fastener.
$R_t$ = pitch radius (action radius) of threads.
$P$ = clamping load $$\mu_f \times R_f > R_c \times \mu_c + R_c \times \tan\alpha° - R_t \times \tan\lambda°$$

Thus, the resultant forces of friction and cam rise are acting on the washers at a location which is approximately in the middle of the contact between the outer tooth section 40 of washer 24 and the joint material 14, and between the cam members 28, respectively.

Referring to FIG. 1, it can be seen that $R_c$ equals the distance between the central axis a—a of bolt 12 and the approximate mid-point of cam members 28; and that $R_f$ equals the distance between the central axis a—a of bolt 12 and the approximate mid-point of outer tooth sections 40. Accordingly, the axial force applied by the fastener 10 is transmitted through cam members 28 into the washer adjacent the joint material, and then outwardly through outer tooth sections 40 — thus providing an extended leverage or moment arm heretofore not made possible with the existing-designed lock washers.

Figure 2:
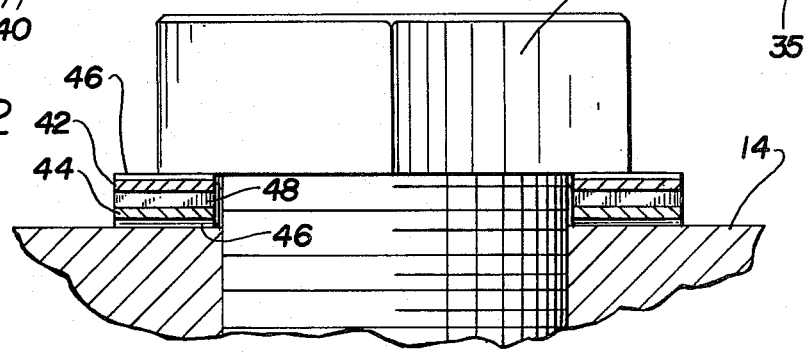
FIG. 2 is a cross-sectional view of the generally well known lock-washer design and its relationship to the applied forces thereto.

Hence, we now refer to FIG. 2 which illustrates the general existing concept of lock-washer means wherein each washer 42 and 44 comprises radial teeth 46 extending across the full width thereof; and cam members 48 also extend the full width of the washer body. Thus, as axial force is applied to the washers, $R_f$ of the teeth 46 is equal to $R_c$ of the cam members 48.

Since $R_f$ equals $R_c$, the moment arm available to prevent the washer 44 from turning in the loosening direction — by friction against the joint material 14 — is no greater than the moment arm acting on washer 42, in order to turn washers together with the nut or capscrew 16 in the loosening direction.

The working principle of the present invention is that $R_c \times \tan\alpha°$ be substantially greater than $R_t \times \tan\rho°$, resulting in a greater rise of the cams than the rise of the threads. Since $R_f$ equals $R_c$ in existing devices, the coefficient of friction or tooth-embedding $\mu_f$ must be substantially greater than the coefficient of friction $\mu_c$ to prevent the pair of washers from turning in the loosening direction.

In cases where the surface of the joint material is softer than that of the washers so that the teeth become embedded in the material, $\mu_f$ is normally greater than $\mu_c$. However, if the joint material has a smooth surface that also is harder than the teeth of the washers, $\mu_f$ would normally be less than $\mu_a$, which may cause the washer adjacent the joint material to turn in the loosening direction.

ALTERNATIVE EMBODIMENT

Referring now to FIG. 5, there is illustrated a nut 50 secured to bolt 52 which fastens lock-washer means 20 in a previously described relationship wherein two washers 54 and 56 are arranged in a cam-face-to-cam-face mating cooperation, the cam member 58 being disposed about the annular inner opening 60 having a width less than the full width of the lock-washer body 62, as hereinbefore described. However, it should be noted that this embodiment of the invention provides a frictional engaging means 25 that is defined by an elongated plurality of teeth 64 extending across substantially the full width of said body 62, wherein each tooth is tapered downwardly and inwardly from the outer peripheral edge 65 to the inner peripheral edge 66 of body 62. This design allows the teeth 64 to engage the joint-material surface 68 at the outer peripheral edge of body 62, whereby only the enlarged end portion or section 70 contacts the surface of the joint material. That is, section 70 of tooth 64 of the washers 56 located adjacent the joint material engages the surface of the joint material. The reduced end portion or section 75 of the upper washer 54 engages the under surface 72 of nut 50.

Accordingly, the applied force on the locking means is transmitted from section 75 of washer 54, through cam members 58, into washer 56, and then out through outer section 70 of lower washer 56 — providing an extended action force having a greater moment arm, as previously described.

In FIGS. 6 and 7, there is shown another embodiment wherein the lock washer, generally indicated at 80, is formed in a similar manner as that illustrated and described in FIGS. 1, 3 and 4, with the exception that the main washer body 82 is formed in the same manner as a bevel washer, wherein body 82 is inclined inwardly and upwardly, thus providing an additional spring-like action. The design may be employed not only with a cooperating lock washer but can be used in cooperation with a nut or cap screw 84 that includes an under surface having a plurality of cam members 85, as seen in FIG. 12.

In FIGS. 8 and 9, the frictional engaging means 25 is provided with an outer tooth section 86, which is tapered inwardly and has the enlarged end adjacent the outer edge of the washer, an inner tooth section 88 being substantially flat throughout its length — the length thereof being less than the full width of the body portion 89.

The locking means as shown in FIGS. 10 and 11 illustrates a further arrangement of the frictional means which comprises an outer, annular, continuous surface defining a peripheral shoulder 90 projecting laterally from one side of the washer body 92. That is, when washer 95 is arranged against surface 96 of joint material or workpiece 97, the full width of shoulder 90 contacts surface 96, thereby creating a greater outer peripheral thickness. However, shoulder 90 has a width w less than half the body width of washer 95. From the inner terminating side of shoulder 90, there is disposed a plurality of radially extended teeth 98 which are formed in an annular recess 100; and the height or thickness of each tooth is less than the depth of recess 100, and thus they can not make engaging contact with surface 96.

Hence, when washer 95 is arranged to engage a nut or cap screw, teeth 98 will directly contact the under surface thereof. It should be further understood that surface 102 can be provided with ridges or beads, such as knurls 104, formed on the metal surface thereof to aid in gripping.

The invention and its attendant advantages will be understood from the foregoing description, and it will be apparent that various changes may be made in the form, construction and arrangement of the parts of the invention without departing from the spirit and scope thereof or sacrificing its material advantages, the arrangement hereinbefofe described being merely by way of example, and I do not wish to be restricted to the specific form or uses mentioned except as defined in the accompanying claims.

I claim:

1. A locking device for fastener means of the type having a nut-and-bolt arrangement, wherein said device comprises:
   at least one annular washer body having a first and second flat plane and a central opening therein, the width of said washer body being defined by an outer peripheral edge and an inner peripheral edge;
   cam means formed on said first flat plane and disposed about the inner peripheral edge thereof having a width less than the width of said washer body, wherein said cam means comprises a plurality of cam members contiguously arranged in a circular group, each cam member having an inclined cam surface and a front cam face;
   frictional means formed on said second flat plane, wherein said frictional means comprises a first outer tooth member, the radial length thereof being equal to or less than half the width of said washer body, and a second inner tooth member, the radial length thereof being equal to or less than half the width of said washer body, and wherein the depth of said first outer tooth member is greater than that of said second inner tooth member, whereby the axial force applied by said fastener means is transmitted from said inner disposed cam members of the first plane to the outer disposed tooth members of the second plane, thus establishing an outwardly extended moment arm.

2. A locking device as recited in claim 1, wherein said first tooth member comprises an annular continuous rib disposed about the outer peripheral edge of said washer body and having a width less than half the width of said washer body, said rib projecting downwardly from said second plane, whereby an annular recess is formed; and wherein said second tooth members are radially disposed therein.

3. A locking device as recited in claim 1, wherein said washer body is inclined upwardly and inwardly, defining a beveled annular body.

4. A locking device as recited in claim 1, wherein said first outer tooth member is inclined inwardly and upwardly, to provide an outer engaging portion thereof, and wherein the thickness of said second inner tooth member is less than said outer engaging portion of said first tooth section.

5. A locking device for fastener means of the type having a nut-and-bolt arrangement, the combination including:
   a first locking member and a second locking member, wherein said first locking member comprises an annular washer body having a first and a second flat plane and a central opening therein, the width of said washer body being defined by an outer and an inner peripheral edge;
   cam means formed on said first flat plane and disposed about the inner peripheral edge thereof having a width less than the width of said washer body;
   frictional means formed on said second flat plane, wherein said frictional means comprises a first outer tooth member, the radial length thereof being equal to or less than half the width of said washer body, and a second inner tooth member, the radial length thereof being equal to or less than half the width of said washer body, and wherein the depth of said first outer tooth member is greater than said second inner tooth member, whereby the axial force applied by said fastener means is transmitted from said inner disposed cam members of the first plane to said outer disposed tooth members of the second plane, thus establishing an outwardly extended moment arm; and
   said second locking member having a cam means substantially identical to said cam means of said first locking member, and disposed so as to cooperate in a mating arrangement with said first locking member.

6. A locking device in combination as recited in claim 5, wherein said second locking member is a nut.

7. A locking device in combination as recited in claim 5, wherein said second locking member is a bolt head.

8. A locking device in combination as recited in claim 5, wherein said second locking member is an annular body identical to said first locking member, and has a first and a second flat plane with cam means and frictional means respectively formed thereon, said cam means of said first locking member being arranged to mate with cam means of said second lock member.

9. A locking device in combination as recited in claim 8, wherein said cam means of each locking member comprises a plurality of cam members contiguously disposed in a circular group, each cam member having an inclined cam surface and a front cam face; and
   wherein said cam means includes a moment arm defined by $R_c$, wherein $R_c$ is the radial distance from the center of the washer body to an approximate mid-point of the width of said cam members;
   said frictional means including a moment arm defined by $R_f$, wherein $R_f$ is the radial distance from the center of the washer body to an approximate mid-point of said friction means.

10. A locking device in combination as recited in claim 9, wherein said first locking member is disposed adjacent the surface of said work material wherein the outer end of each tooth engages said work material;
   said second locking member being disposed adjacent the nut or bolt head of said fastener where the inner end of each tooth thereon engages said nut or bolt head thereof, whereby the applied force of said fastener to said second locking member is transmitted to said first locking member, and wherein the frictional force between the first locking member is greater than the applied force to the second locking member, thereby preventing rotational movement of said locking means and said fastener.

* * * * *